(12) United States Patent
Sun et al.

(10) Patent No.: US 12,009,932 B2
(45) Date of Patent: Jun. 11, 2024

(54) TYPE 3 HYBRID AUTOMATIC REPEAT REQUEST CODEBOOK FOR SIDELINK

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 217 days.

(21) Appl. No.: 17/445,260

(22) Filed: Aug. 17, 2021

(65) Prior Publication Data
US 2022/0103303 A1  Mar. 31, 2022

Related U.S. Application Data

(60) Provisional application No. 63/198,058, filed on Sep. 25, 2020.

(51) Int. Cl.
*H04B 7/0456* (2017.01)
*H04L 1/1812* (2023.01)
*H04L 1/1867* (2023.01)
*H04W 72/20* (2023.01)

(52) U.S. Cl.
CPC ......... *H04L 1/1819* (2013.01); *H04B 7/0456* (2013.01); *H04L 1/1896* (2013.01); *H04W 72/20* (2023.01)

(58) Field of Classification Search
CPC ... H04L 1/1614; H04L 1/1664; H04L 1/1819; H04L 1/1822; H04L 1/1861; H04L 1/1896; H04L 5/001; H04L 5/0026; H04L 5/0033; H04L 5/0053; H04L 5/0055; H04L 5/0091; H04W 72/20; H04B 7/0456

See application file for complete search history.

(56) References Cited

U.S. PATENT DOCUMENTS

| | | | |
|---|---|---|---|
| 2020/0099476 A1* | 3/2020 | Park | H04W 4/70 |
| 2021/0250924 A1* | 8/2021 | Ji | H04W 76/14 |
| 2021/0321396 A1* | 10/2021 | Li | H04W 72/0446 |
| 2022/0263638 A1* | 8/2022 | Zhao | H04L 5/0053 |
| 2022/0294570 A1* | 9/2022 | Hahn | H04L 5/0048 |
| 2022/0304029 A1* | 9/2022 | Wu | H04L 1/1812 |
| 2022/0312241 A1* | 9/2022 | Xu | H04W 72/044 |

(Continued)

FOREIGN PATENT DOCUMENTS

WO   WO-2020032762 A1   2/2020

OTHER PUBLICATIONS

Nokia, Nokia Shanghai Bell; "Discussion on Sidelink groupcast HARQ"; 3GPP TSG-RAN WG1 Meeting #96bis Xi'an, China, Apr. 8-12, 2019; R1-1905340 (Year: 2019).*

(Continued)

*Primary Examiner* — Gary Mui
(74) *Attorney, Agent, or Firm* — Harrity & Harrity, LLP

(57) ABSTRACT

Various aspects of the present disclosure generally relate to wireless communication. In some aspects, a user equipment (UE) may receive sidelink control information (SCI) indicating that the UE is to transmit sidelink hybrid automatic repeat request (HARQ) feedback in a type 3 codebook. The UE may transmit the type 3 codebook on a physical sidelink channel for one or more sidelink HARQ processes based at least in part on the SCI. Numerous other aspects are provided.

30 Claims, 10 Drawing Sheets

(56) References Cited

U.S. PATENT DOCUMENTS

| | | | |
|---|---|---|---|
| 2023/0048080 A1* | 2/2023 | Takahashi | H04L 1/1812 |
| 2023/0094711 A1* | 3/2023 | Wu | H04L 1/1887 |
| | | | 370/329 |
| 2023/0113672 A1* | 4/2023 | Wu | H04L 1/1861 |
| | | | 370/329 |

OTHER PUBLICATIONS

Asia Pacific Telecom: "Discussion on HARQ-ACK Enhancements", 3GPP Draft, 3GPP TSG-RAN WG1 Meeting #102-e, R1-2006639, 3rd Generation Partnership Project (3GPP), Mobile Competence Centre, 650, Route Des Lucioles, F-06921 Sophia-Antipolis Cedex, France, vol. RAN WG1, No. e-Meeting, 20200817-20200828, Aug. 8, 2020 (Aug. 8, 2020), XP051918162, 2 Pages, Retrieved from the Internet: URL: https://ftp.3gpp.org/tsg_ran/WG1_RL1/TSGR1_102-e/Docs/R1-2006639.zip. R1-2006639, Discussion on HARQ-ACK Enhancements.docx. [Retrieved on Aug. 8, 2020]. Section 2.

CAICT: "Considerations on the Resource Allocation for NR Sidelink Mode2", 3GPP Draft, 3GPP TSG RAN WG1 #98bis, R1-1911323, 3rd Generation Partnership Project (3GPP), Mobile Competence Centre, 650, Route Des Lucioles, F-06921 Sophia-Antipolis Cedex, France, vol. RAN WG1, No. Chongqing, China, 20191014-20191020, Oct. 7, 2019 (Oct. 7, 2019), XP051809048, 5 Pages, Retrieved from the Internet: URL: https://ftp.3gpp.org/tsg_ran/WG1_RL1/TSGR1_98b/Docs/R1-1911323.zip. R1-1911323.docx [retrieved on Oct. 7, 2019] the whole document.

International Search Report and Written Opinion—PCT/US2021/071221—ISA/EPO—dated Nov. 26, 2021.

* cited by examiner

TYPE 3 HYBRID AUTOMATIC REPEAT REQUEST CODEBOOK FOR SIDELINK

CROSS-REFERENCE TO RELATED APPLICATION

This Patent Application claims priority to U.S. Provisional Patent Application No. 63/198,058, filed on Sep. 25, 2020, entitled "TYPE 3 HYBRID AUTOMATIC REPEAT REQUEST CODEBOOK FOR SIDELINK," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using a type 3 hybrid automatic repeat request codebook for sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving sidelink control information (SCI) indicating that the UE is to transmit sidelink hybrid automatic repeat request (HARQ) feedback in a type 3 codebook, and transmitting the type 3 codebook on a physical sidelink channel for one or more sidelink HARQ processes based at least in part on the SCI.

In some aspects, a method of wireless communication performed by a UE includes transmitting, to another UE, SCI indicating that the other UE is to transmit sidelink HARQ feedback for one or more sidelink HARQ processes in a type 3 codebook, and receiving the type 3 codebook from the other UE on a physical sidelink channel after transmitting the SCI.

In some aspects, a UE for wireless communication includes a memory and one or more processors coupled to the memory, the one or more processors configured to receive SCI indicating that the UE is to transmit sidelink HARQ feedback in a type 3 codebook, and transmit the type 3 codebook on a physical sidelink channel for one or more sidelink HARQ processes based at least in part on the SCI.

In some aspects, a UE for wireless communication includes a memory and one or more processors coupled to the memory, the one or more processors configured to: transmit, to another UE, SCI indicating that the other UE is to transmit sidelink HARQ feedback for one or more sidelink HARQ processes in a type 3 codebook, and receive the type 3 codebook from the other UE on a physical sidelink channel after transmitting the SCI.

In some aspects, a non-transitory computer-readable medium storing a set of instructions for wireless communication includes one or more instructions that, when executed by one or more processors of a UE, cause the UE to receive SCI indicating that the UE is to transmit sidelink HARQ feedback in a type 3 codebook, and transmit the type 3 codebook on a physical sidelink channel for one or more sidelink HARQ processes based at least in part on the SCI.

In some aspects, a non-transitory computer-readable medium storing a set of instructions for wireless communication includes one or more instructions that, when executed by one or more processors of a UE, cause the UE to transmit, to another UE, SCI indicating that the other UE is to transmit sidelink HARQ feedback for one or more sidelink HARQ processes in a type 3 codebook, and receive the type 3 codebook from the other UE on a physical sidelink channel after transmitting the SCI.

In some aspects, an apparatus for wireless communication includes means for receiving SCI indicating that the apparatus is to transmit sidelink HARQ feedback in a type 3 codebook, and means for transmitting the type 3 codebook on a physical sidelink channel for one or more sidelink HARQ processes based at least in part on the SCI.

In some aspects, an apparatus for wireless communication includes means for transmitting, to another apparatus, SCI indicating that the other apparatus is to transmit sidelink HARQ feedback for one or more sidelink HARQ processes in a type 3 codebook, and means for receiving the type 3 codebook from the other apparatus on a physical sidelink channel after transmitting the SCI.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
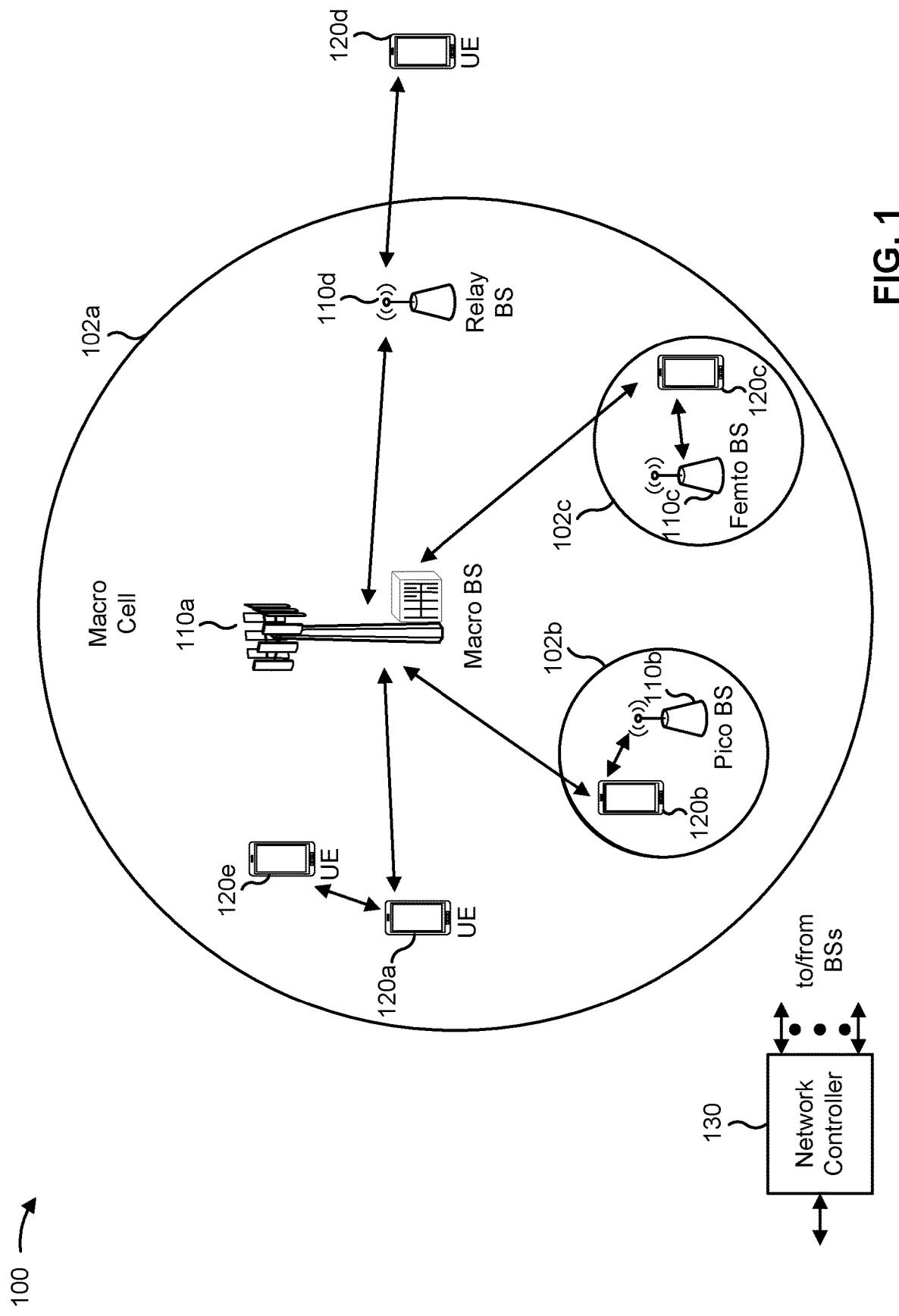
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, vehicle-to-pedestrian (V2P), or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
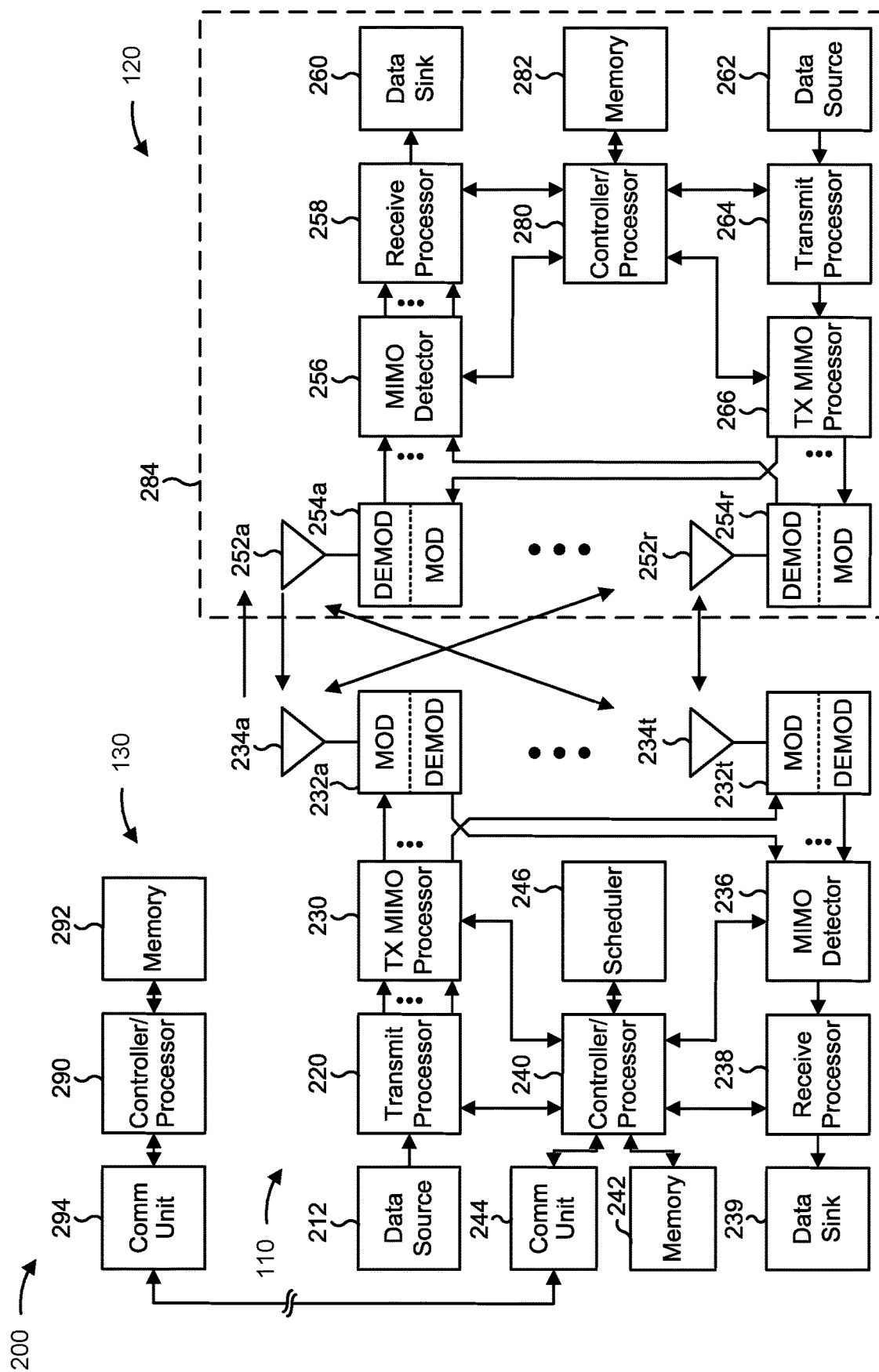
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure.

Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-10).

Controller/processor 240 of base station 110, controller/processor 280 of UE 120, and/or any other component(s) of FIG. 2 may perform one or more techniques associated with a type 3 hybrid automatic repeat request (HARQ) codebook for sidelink, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 includes means for receiving SCI indicating that the UE is to transmit sidelink HARQ feedback in a type 3 codebook, and/or means for transmitting the type 3 codebook on a physical sidelink channel for one or more sidelink HARQ processes based at least in part on the SCI. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for transmitting a new data indicator for each corresponding sidelink HARQ process of the one or more sidelink HARQ processes.

In some aspects, UE 120 includes means for determining a physical sidelink feedback channel (PSFCH) resource for the type 3 codebook from a type 3 PSFCH resource pool.

In some aspects, UE 120 includes means for transmitting the type 3 codebook on the PSFCH as a single type 3 codebook for a plurality of PSFCH feedbacks based at least in part on determining that at least one of the plurality of PSFCH feedbacks is a type 3 codebook.

In some aspects, UE 120 includes means for selecting the single type 3 codebook from among a plurality of type 3 codebooks, where selecting the single type 3 codebook includes selecting a type 3 codebook with a lowest index of indices of the plurality of type 3 codebooks.

In some aspects, UE 120 includes means for selecting the single type 3 codebook based at least in part on a PSFCH resource hash of one or more of a source identifier or a destination identifier.

In some aspects, UE 120 includes means for transmitting, to another UE, SCI indicating that the other UE is to transmit sidelink HARQ feedback for one or more sidelink HARQ processes in a type 3 codebook, and/or means for receiving the type 3 codebook from the other UE on a physical sidelink channel after transmitting the SCI. The means for UE 120 to perform operations described herein may include, for example, antenna 252, demodulator 254, MIMO detector 256, receive processor 258, transmit processor 264, TX MIMO processor 266, modulator 254, controller/processor 280, and/or memory 282.

In some aspects, UE 120 includes means for receiving a new data indicator for each corresponding sidelink HARQ process of the one or more sidelink HARQ processes.

In some aspects, UE 120 includes means for receiving a single type 3 codebook on the PSFCH, as the type 3 codebook, for a plurality of PSFCH feedbacks.

As indicated above, FIG. 2 is provided as an example. Other examples may differ from what is described with regard to FIG. 2.

Figure 3:
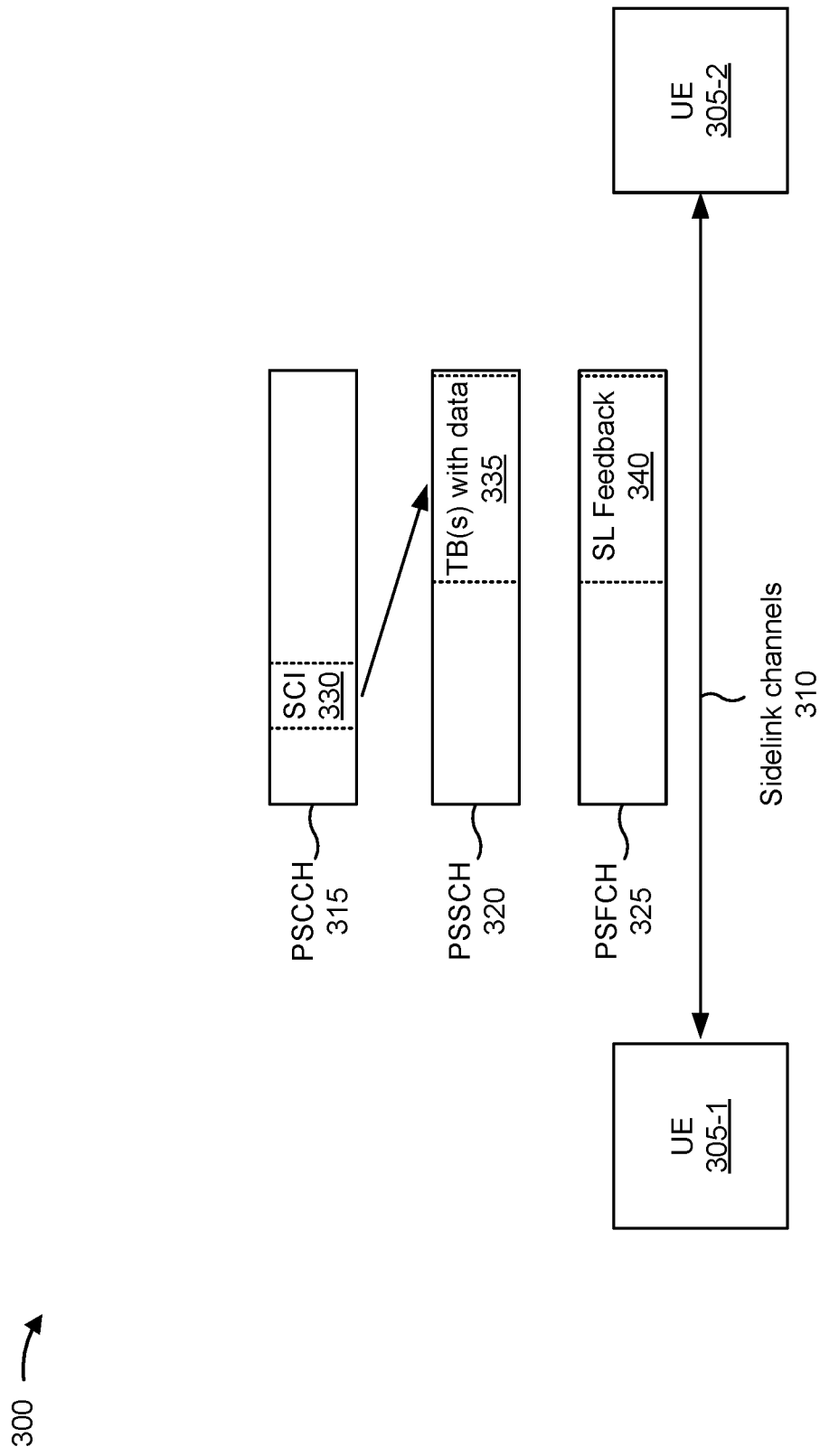
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a PSFCH 325. The PSCCH 315 may be used to communicate control information, similar to a physical downlink control channel (PDCCH) and/or a PUCCH used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as HARQ feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing (FDM)). In some aspects, a scheduling assignment and associated data transmissions are not transmitted on adjacent RBs.

A PSFCH resource may be from a resource pool, but not a dedicated PSFCH resource pool. A parameter (e.g., periodPSFCHresource) may refer to a period in slots for PSFCH transmission in a resource pool. The supported periods may be 0, 1, 2, and 4 (0 means no PSFCH). A PSFCH transmission timing may be the first slot with a PSFCH resource after a PSSCH and after a minimum time gap (e.g., MinTimeGapPSFCH) after the PSSCH. $M_{PRB,set}^{PSFCH}$:rbSetPSFCH defines a set of physical resource blocks (PRBs) for PSFCH in a slot. The set of PRBs may be split between $N_{PSSCH}^{PSFCH}$ (quantity of PSSCH slots corresponds to the PSFCH slot) and $N_{subch}$ PSSCH in a slot. Basically, each subchannel/slot may have $$M_{subch,slot}^{PSFCH} = \frac{M_{PRB,set}^{PSFCH}}{N_{PSSCH}^{PSFCH} \times N_{subch}} PRBs.$$

This may include time first mapping from a PSSCH resource to PSFCH PRBs. A PSFCH resource pool may be of size: $R_{PRB,CS}^{PSFCH} = N_{type}^{PSFCH} \times N_{CS}^{PSFCH} \times M_{subch,slot}^{PSFCH}$. $N_{CS}^{PSFCH}$ may be the number of circuit switched (CS) pairs, configured per resource pool (pair is for acknowledgement (ACK) or negative acknowledgement (ACK), or A/N, 1 bit). $N_{type}^{PSFCH}$ may be 1 or $N_{subch}^{PSSCH}$. For subchannels in a PSSCH slot, the PSFCH resource pool may be shared or not shared. Within the PSFCH resource pool, the PSFCH resource may be indexed from within a PRB index, then in a CS pair index. A PSFCH resource may be determined by $(P_{ID}+M_{ID})$ mod $R_{PRB,CS}^{PSFCH}$, where $P_{ID}$ is a physical source ID from SCI 0-2 for a PSSCH, and $M_{ID}$ is either 0 or identifies the UE receiving the PSSCH.

In some aspects, a UE 305 may operate using a transmission mode, known as sidelink mode 2, where resource selection and/or scheduling is performed by the UE 305 (e.g., rather than a base station 110 in sidelink mode 1). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode (sidelink mode 2) where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

For PSCCH/PSSCH transmission, sidelink HARQ feedback (e.g., A/N) for a PSSCH may be transmitted on a PSFCH. The PSFCH may be a single RB symbol with a same format as a physical uplink control channel (PUCCH) format 0. The PSFCH may be 1 bit. If a UE needs to send multiple bits for sidelink HARQ feedback, the UE may need to send sidelink HARQ feedback that is FDMed on the PSFCH, including when multiple PSSCHs are received from the same source UE. The UE may also receive multiple PSSCHs from different source UEs, and the UE may need to send a PSFCH to each of the source UEs.

A UE is limited as to how many PSFCHs that the UE can multiplex in the same symbol. For multiple A/N bits that are to be transmitted to the same source UE, the A/N bits may be collected into a codebook and transmitted in a single channel. For sidelink to an enhanced mobile broadband (eMBB), there may be a continuous stream of bits on a PSSCH to the same UE.

As indicated above, FIG. 3 is provided as an example. Other examples may differ from what is described with respect to FIG. 3.

Figure 4:
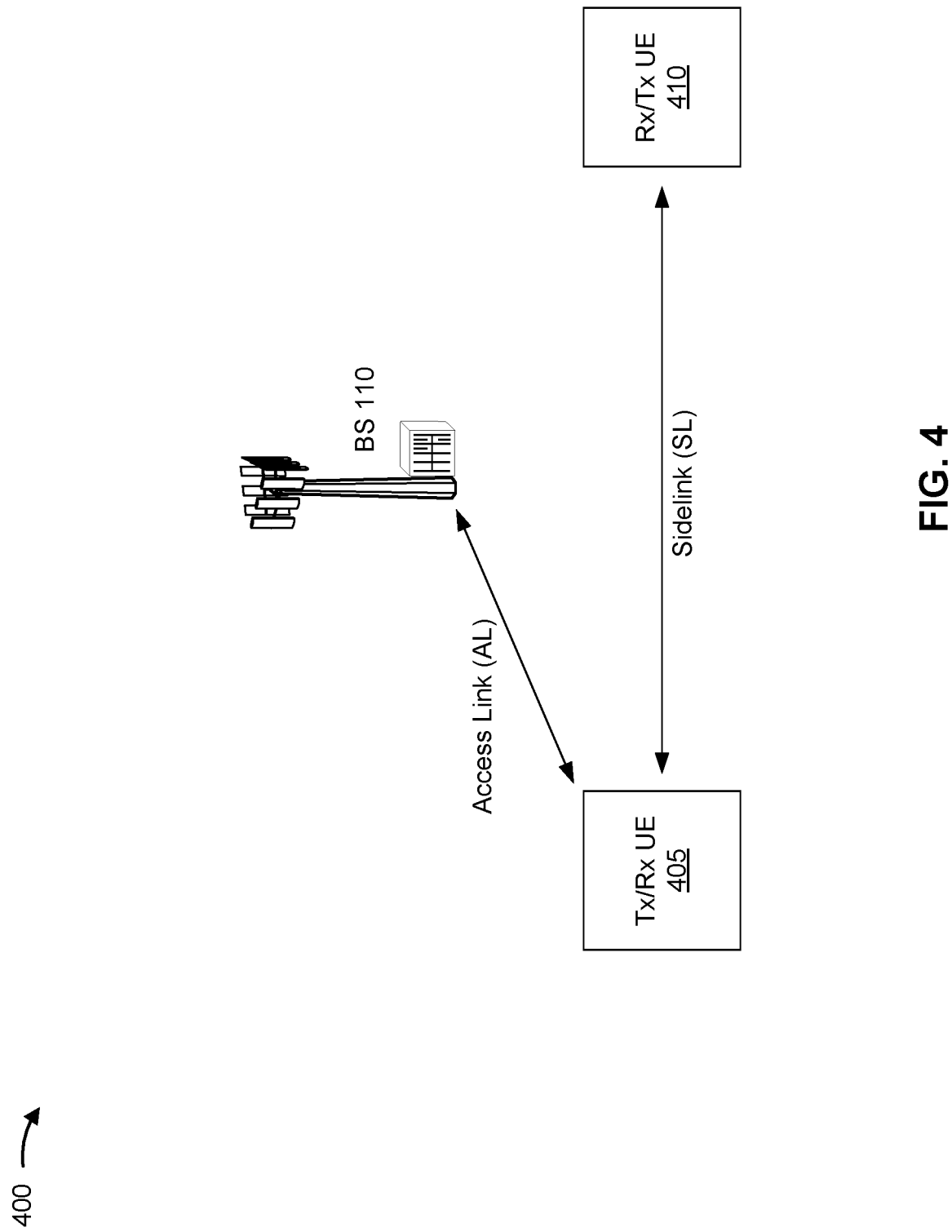
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, such as sidelink mode 1, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. A direct link between UEs 405 and 410 (e.g., via a PC5 interface) may be referred to as a sidelink, and a direct link between a base station 110 and UE 405 (e.g., via a Uu interface) may be referred to as an access link. Sidelink communications may be transmitted via the sidelink, and access link communications may be transmitted via the access link. An access link communication may be either a downlink communication (from base station 110 to UE 405) or an uplink communication (from UE 405 to base station 110). UE 405 may use a type 3 codebook, triggered by a bit added in downlink control information (DCI) format 1_1, to report an ACK or NACK for all configured HARQ processes for the Uu interface. A type 3 codebook may be used to map data to antennas and/or a physical channel to provide more accurate feedback than type I or type II codebooks. UE 405 may also report a new data indicator (NDI) for each HARQ process with the ACK or NACK.

In sidelink mode 1, base station 110 specifies resources, via DCI on the access link, for UE 405 to use for transmitting a sidelink communication to UE 410 on the sidelink. Base station 110 may transmit DCI to schedule the sidelink communication and indicate a HARQ feedback report timing (e.g., timing value k for a time duration between receiving DCI and transmitting HARQ feedback). Base station 110 may indicate a resource indicator, and the sidelink HARQ feedback that is reported by UE 405 may depend on a PSFCH resource specified by base station 110. Base station 110 may configure a type 1 sidelink configured grant (CG), and a radio resource control (RRC) parameter may include a parameter (e.g., sl-ACKtoUL-ACK) to indicate a timing for the sidelink HARQ feedback. Base station 110 may configure type 2 sidelink CG, and activation DCI 3_0 may provide the timing for the sidelink HARQ feedback. UE 410 may send sidelink HARQ feedback (ACK or NACK) for a sidelink communication to UE 405, and UE 405 may report the sidelink HARQ feedback to base station 110. The sidelink HARQ feedback may be multiplexed into a codebook that is reported on PUCCH or PUSCH. However, if there is a collision between sidelink HARQ feedback, an uplink communication (e.g., on a Uu interface), and/or HARQ feedback for the uplink communication, there is a mechanism to drop the sidelink HARQ feedback, the uplink communication, and/or the HARQ feedback for the Uu interface.

The mechanism for dropping a communication or HARQ feedback may involve prioritizing the sidelink HARQ feedback, the uplink communication, and/or the HARQ feedback for the uplink communication. A priority value of 0 indicates a highest priority, and 1 indicates a next highest priority. If an uplink communication with a priority value of 1 is to be transmitted, such as for ultra-reliable low-latency communication (URLLC), UE 405 may transmit the sidelink HARQ feedback if a priority value of the sidelink HARQ feedback is lower (higher priority) than a certain threshold for URLLC (e.g., sl-PriorityThresholdULURLLC). Otherwise, UE 405 may transmit the uplink communication and drop the sidelink HARQ feedback. A priority value of 1 for an uplink communication is a higher priority than a priority value of 2 for the sidelink HARQ feedback. UE 405 may determine to transmit an uplink communication with a priority value of 0 for enhanced mobile broadband (eMBB). If the sidelink HARQ feedback has a lower priority value than a sidelink priority threshold (e.g., sl-Priority Threshold), UE 405 may transmit the sidelink HARQ feedback. Otherwise, UE 405 may transmit an uplink communication with a priority value of 0. In sum, base station 110 may use an RRC configuration to prioritize between an uplink transmission/HARQ feedback (URLLC or eMBB) on the PUCCH/PUSCH and sidelink HARQ feedback on the PUCCH.

As indicated above, FIG. 4 is provided as an example. Other examples may differ from what is described with respect to FIG. 4.

Figure 5:
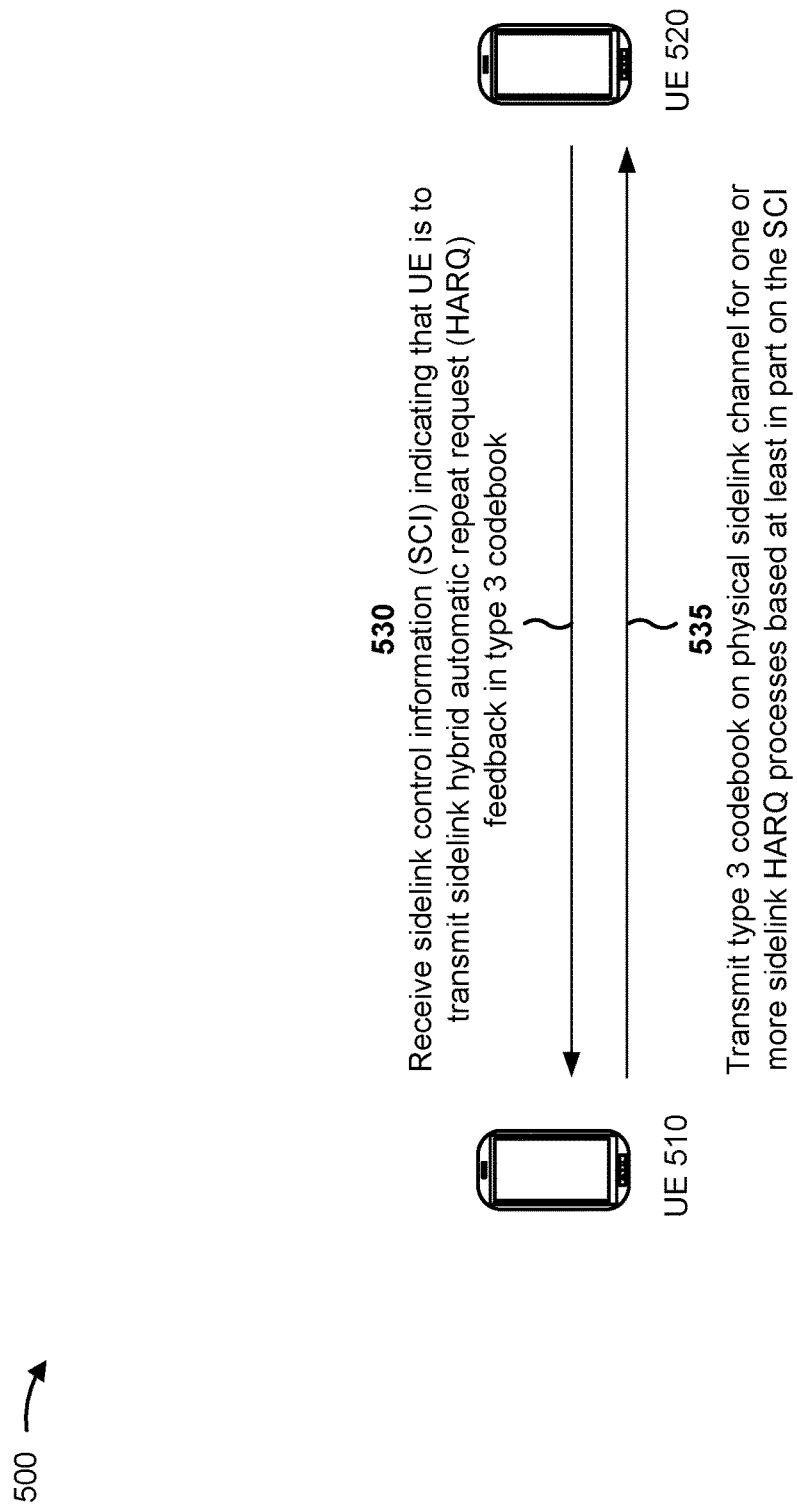
FIG. 5 is a diagram illustrating an example of using a type 3 hybrid automatic repeat request (HARQ) codebook for sidelink, in accordance with the present disclosure.

FIG. 5 is a diagram illustrating an example 500 of using a type 3 HARQ codebook for sidelink, in accordance with the present disclosure. As shown in FIG. 5, example 500 includes communications between UE 510 (e.g., a UE 120 depicted in FIGS. 1 and 2) and UE 520. UE 510 and UE 520 may communicate on a sidelink, such as on a PC5 interface. FIG. 5 also shows that UE 510 and UE 520 may communicate on a sidelink in sidelink mode 2, where UE 520 specifies a sidelink channel resource in SCI to UE 510 for transmitting a sidelink communication.

A PSFCH solution for sidelink HARQ feedback may leverage a PUCCH format 2, 3, or 4 used on a Uu interface, such as a bit in DCI 1_1 for reporting all HARQ feedback. However, this may disrupt existing PSFCH usage and not address backward compatibility issues. As a result, a UE may waste power, processing resources, and signaling resources using an inefficient design for sidelink HARQ feedback on the PSFCH.

According to various aspects described herein, a UE may use a type 3 codebook for transmitting sidelink HARQ feedback to another UE on the PSFCH. For example, a UE may use one or more bits in SCI (e.g., SCI1, SCI2) to indicate that another UE is to transmit sidelink HARQ feedback, for one or more sidelink communications, in a type 3 codebook on the PSFCH. The UE receiving the SCI may multiplex sidelink HARQ feedback (e.g., ACK/NACK (A/N) bits for one or more HARQ processes) for one or more sidelink communications into the type 3 codebook. The UE may also be configured (e.g., via an RRC message) to report an NDI that corresponds to an A/N bit. As a result, the UE does not waste power, processing resources, and signaling resources using an inefficient design for sidelink HARQ feedback on the PSFCH.

Example 500 involves sidelink mode 2 and thus UE 520 may indicate sidelink resources to UE 510 for communication and feedback. As shown by reference number 530, UE 510 may receive SCI indicating that UE 510 is to transmit sidelink feedback in a type 3 codebook. UE 510 may receive a sidelink communication from UE 520 and have sidelink HARQ feedback to report to UE 520.

UE 510 may multiplex the sidelink HARQ feedback into a HARQ ACK codebook that is a type 3 codebook. The type 3 codebook may include sidelink HARQ feedback for one or more HARQ processes. As shown by reference number 535, UE 510 may transmit the type 3 codebook to UE 520. By indicating a type 3 codebook for sidelink HARQ feedback in SCI to UE 510, UE 520 may more efficiently receive sidelink HARQ feedback on the PSFCH from UE 510, and conserve power, processing resources, and signaling resources.

As indicated above, FIG. 5 is provided as an example. Other examples may differ from what is described with regard to FIG. 5.

Figure 6:
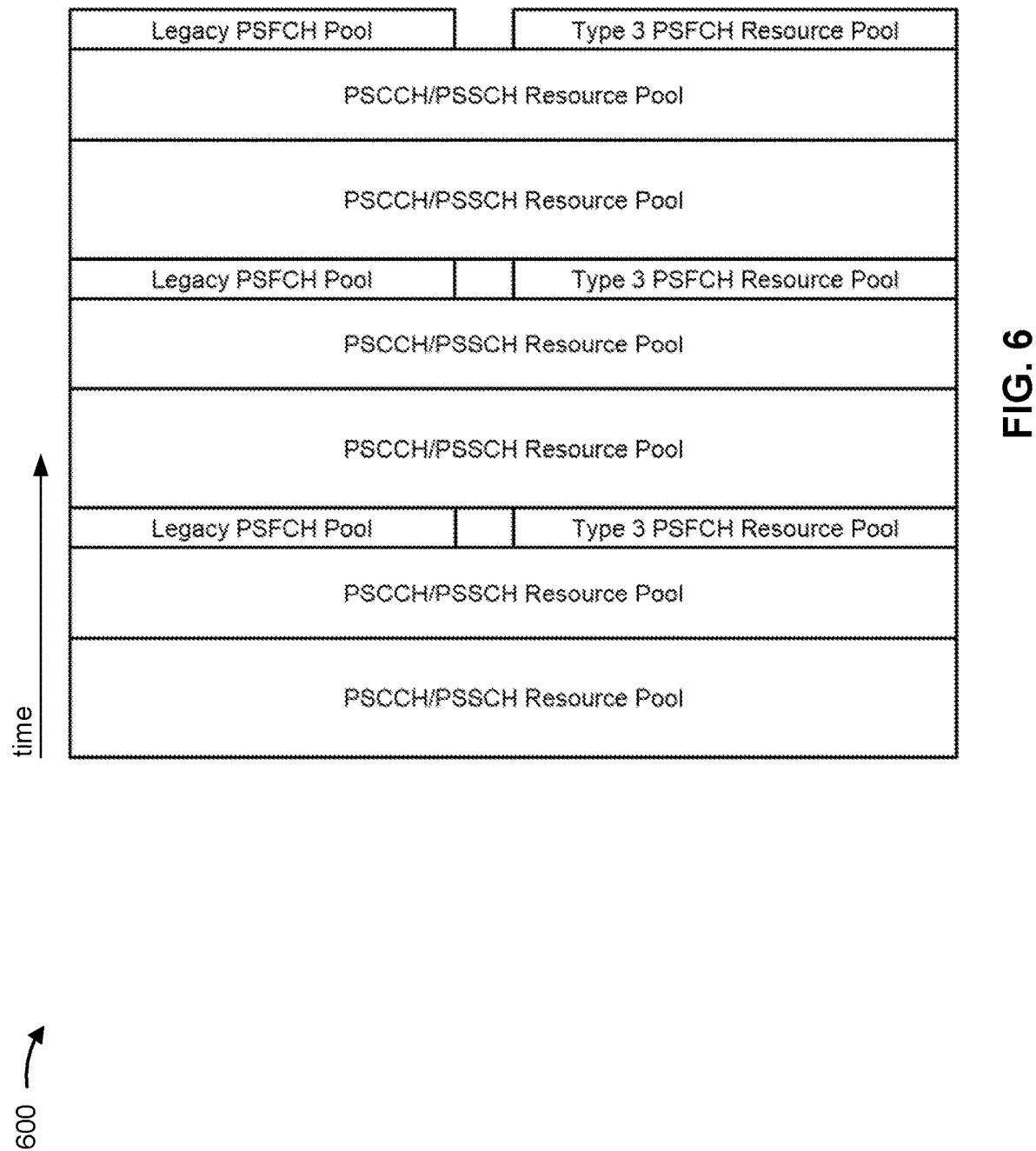
FIG. 6 is a diagram illustrating an example of using a type 3 HARQ codebook for sidelink, in accordance with the present disclosure.

FIG. 6 is a diagram illustrating an example 600 of using a type 3 HARQ codebook for sidelink, in accordance with the present disclosure. Example 600 shows resource pools for each slot.

In some aspects, a UE may use, or hash to, PSFCH resources that are separately configured from PSCCH and PSSCH resources for transmitting sidelink HARQ feedback in a type 3 codebook. Example 600 shows that there are resource pools for PSCCH/PSSCH. After certain PSCCH/PSSCH resource pools, according to a slot/resource configuration, there may be a pool of PSFCH resources for a legacy reporting structure (indicated with a single bit) and a pool of PSFCH resources for type 3 codebook (indicated by a new structure or bit(s) in SCI).

In some aspects, instead of using PSFCH resources for the type 3 codebook, a receiving UE, which receives a sidelink communication and will transmit sidelink HARQ feedback, may initiate a sidelink communication with the type 3 codebook on PSCCH or PSSCH resources, back to a transmitting UE.

The transmitting UE may use SCI2 to indicate using a type 3 codebook for sidelink HARQ feedback on the PSFCH, and may use SCI1 to indicate a new SCI2 format for type 3 codebook information. The receiving UE may select any resources for transmitting the type 3 codebook on the PSCCH or PSSCH, as the transmitting UE may detect all of these resources.

In some aspects, a receiving UE may be expected to transmit sidelink HARQ feedback on multiple PSFCHs to the same transmitting UE at the same time. At least one of the multiple sidelink HARQ feedbacks may be a type 3 codebook. Therefore, the receiving UE may transmit a single type 3 codebook, because the content multiplexed in the type 3 codebook may cover the other PSFCHs.

The receiving UE may select a PSFCH structure for which both the receiving UE and a transmitting UE are configured. For example, the receiving UE may select a type 3 codebook for a PSFCH having the lowest index, or select a PSFCH resource that is hashed in the PSFCH resource pool with a source identifier and/or a destination identifier for the transmitting UE and/or the receiving UE. By selecting a single type 3 codebook for the sidelink HARQ feedback, the receiving UE may save signaling resources when transmitting the sidelink HARQ feedback.

As indicated above, FIG. 6 is provided as an example. Other examples may differ from what is described with regard to FIG. 6.

Figure 7:
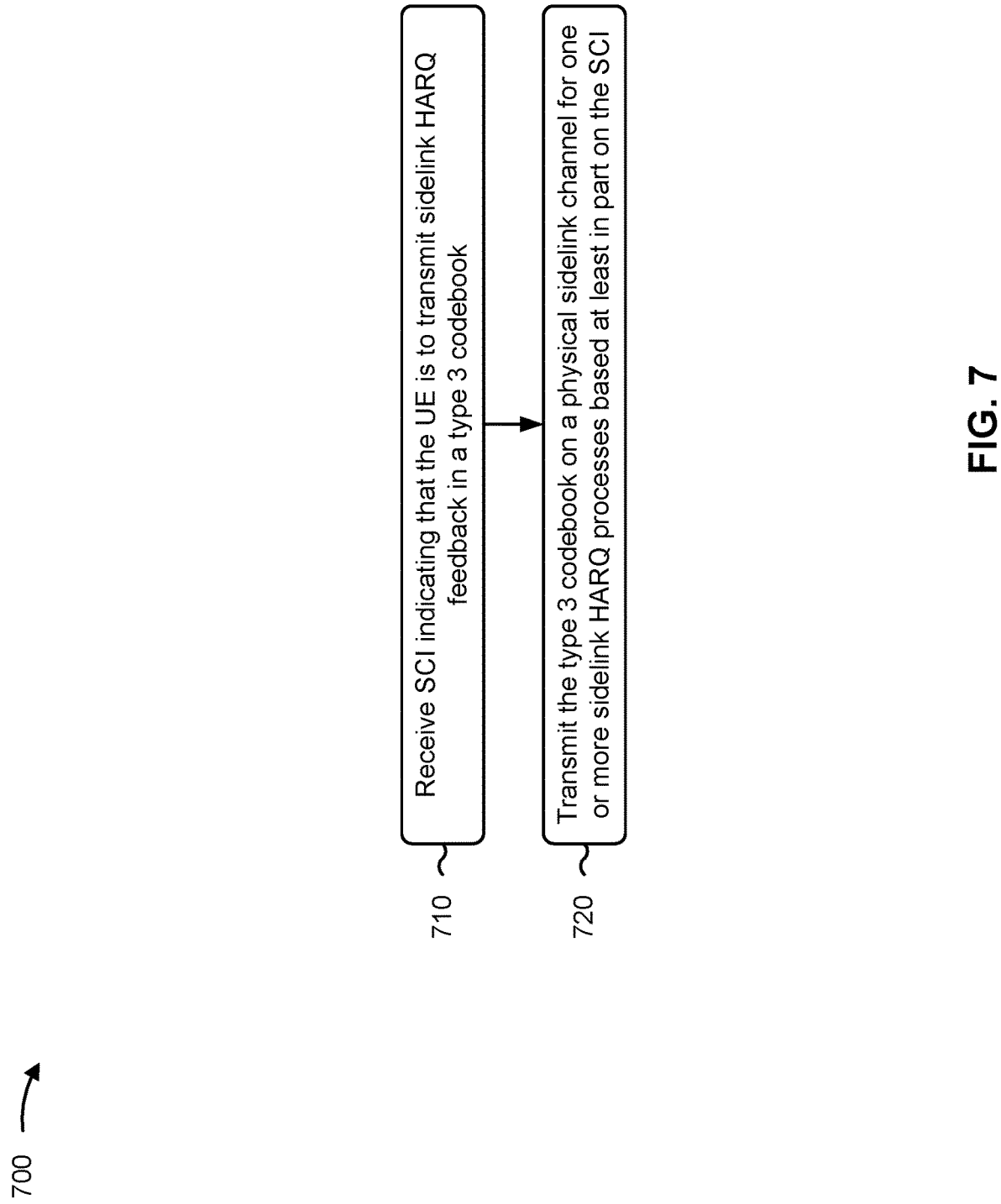
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1-2, UE 305 depicted in FIG. 3, UE 405 or UE 410 depicted in FIG. 4, UE 510 or UE 520 depicted in FIG. 5) performs operations associated with using a type 3 HARQ codebook for sidelink.

As shown in FIG. 7, in some aspects, process 700 may include receiving SCI indicating that the UE is to transmit sidelink HARQ feedback in a type 3 codebook (block 710). For example, the UE (e.g., using reception component 902 depicted in FIG. 9) may receive SCI indicating that the UE is to transmit sidelink HARQ feedback in a type 3 codebook, as described above.

As further shown in FIG. 7, in some aspects, process 700 may include transmitting the type 3 codebook on a physical sidelink channel for one or more sidelink HARQ processes based at least in part on the SCI (block 720). For example, the UE (e.g., using transmission component 904 depicted in FIG. 9) may transmit the type 3 codebook on a physical sidelink channel for one or more sidelink HARQ processes based at least in part on the SCI, as described above.

Process 700 may include additional aspects, such as any single aspect or any combination of aspects described below and/or in connection with one or more other processes described elsewhere herein.

In a first aspect, the sidelink HARQ feedback includes, for each of the one or more sidelink HARQ processes, a HARQ ACK or NACK that is multiplexed into the type 3 codebook.

In a second aspect, alone or in combination with the first aspect, process 700 includes transmitting an NDI for each corresponding sidelink HARQ process of the one or more sidelink HARQ processes.

In a third aspect, alone or in combination with one or more of the first and second aspects, the physical sidelink channel includes a PSFCH.

In a fourth aspect, alone or in combination with one or more of the first through third aspects, process 700 includes determining a PSFCH resource for the type 3 codebook from a type 3 PSFCH resource pool.

In a fifth aspect, alone or in combination with one or more of the first through fourth aspects, process 700 includes transmitting the type 3 codebook on the PSFCH as a single type 3 codebook for a plurality of PSFCH feedbacks based at least in part on determining that at least one of the plurality of PSFCH feedbacks is a type 3 codebook.

In a sixth aspect, alone or in combination with one or more of the first through fifth aspects, process 700 includes selecting the single type 3 codebook from among a plurality of type 3 codebooks, and selecting the single type 3 codebook includes selecting a type 3 codebook with a lowest index of indices of the plurality of type 3 codebooks.

In a seventh aspect, alone or in combination with one or more of the first through sixth aspects, process 700 includes selecting the single type 3 codebook based at least in part on a PSFCH resource hash of one or more of a source identifier or a destination identifier.

In an eighth aspect, alone or in combination with one or more of the first through seventh aspects, the physical sidelink channel includes a PSCCH or a PSSCH.

In a ninth aspect, alone or in combination with one or more of the first through eighth aspects, the SCI is in format SCI2.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
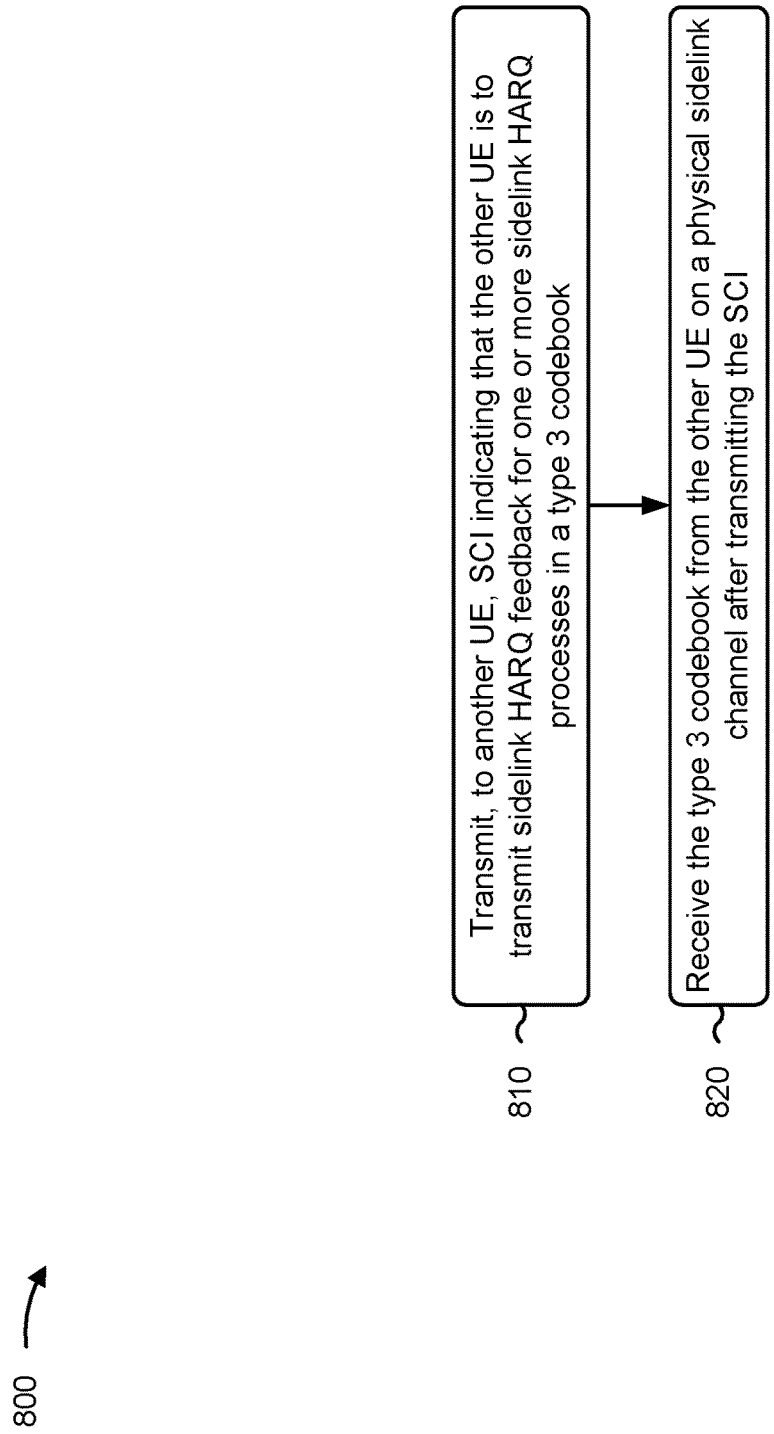
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 depicted in FIGS. 1-2, UE 305 depicted in FIG. 3, UE 405 or UE 410 depicted in FIG. 4, UE 510 or UE 520 depicted in FIG. 5) performs operations associated with using a type 3 HARQ codebook for sidelink.

As shown in FIG. 8, in some aspects, process 800 may include transmitting, to another UE, SCI indicating that the other UE is to transmit sidelink HARQ feedback for one or more sidelink HARQ processes in a type 3 codebook (block 810). For example, the UE (e.g., using transmission component 1004 depicted in FIG. 10) may transmit, to another UE, SCI indicating that the other UE is to transmit sidelink HARQ feedback for one or more sidelink HARQ processes in a type 3 codebook, as described above.

As further shown in FIG. 8, in some aspects, process 800 may include receiving the type 3 codebook from the other UE on a physical sidelink channel after transmitting the SCI (block 820). For example, the UE (e.g., using reception component 1002 depicted in FIG. 10) may receive the type 3 codebook from the other UE on a physical sidelink channel after transmitting the SCI, as described above.

Process 800 may include additional aspects, such as any single aspect or any combination of aspects described below and/or in connection with one or more other processes described elsewhere herein.

In a first aspect, the sidelink HARQ feedback includes, for each of the one or more sidelink HARQ processes, a HARQ ACK or NACK that is multiplexed into the type 3 codebook.

In a second aspect, alone or in combination with the first aspect, process 800 includes receiving an NDI for each corresponding sidelink HARQ process of the one or more sidelink HARQ processes.

In a third aspect, alone or in combination with one or more of the first and second aspects, the physical sidelink channel includes a PSFCH.

In a fourth aspect, alone or in combination with one or more of the first through third aspects, process 800 includes receiving a single type 3 codebook on the PSFCH, as the type 3 codebook, for a plurality of PSFCH feedbacks.

In a fifth aspect, alone or in combination with one or more of the first through fourth aspects, the physical sidelink channel includes a PSCCH or a PSSCH.

In a sixth aspect, alone or in combination with one or more of the first through fifth aspects, the SCI is in format SCI2.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
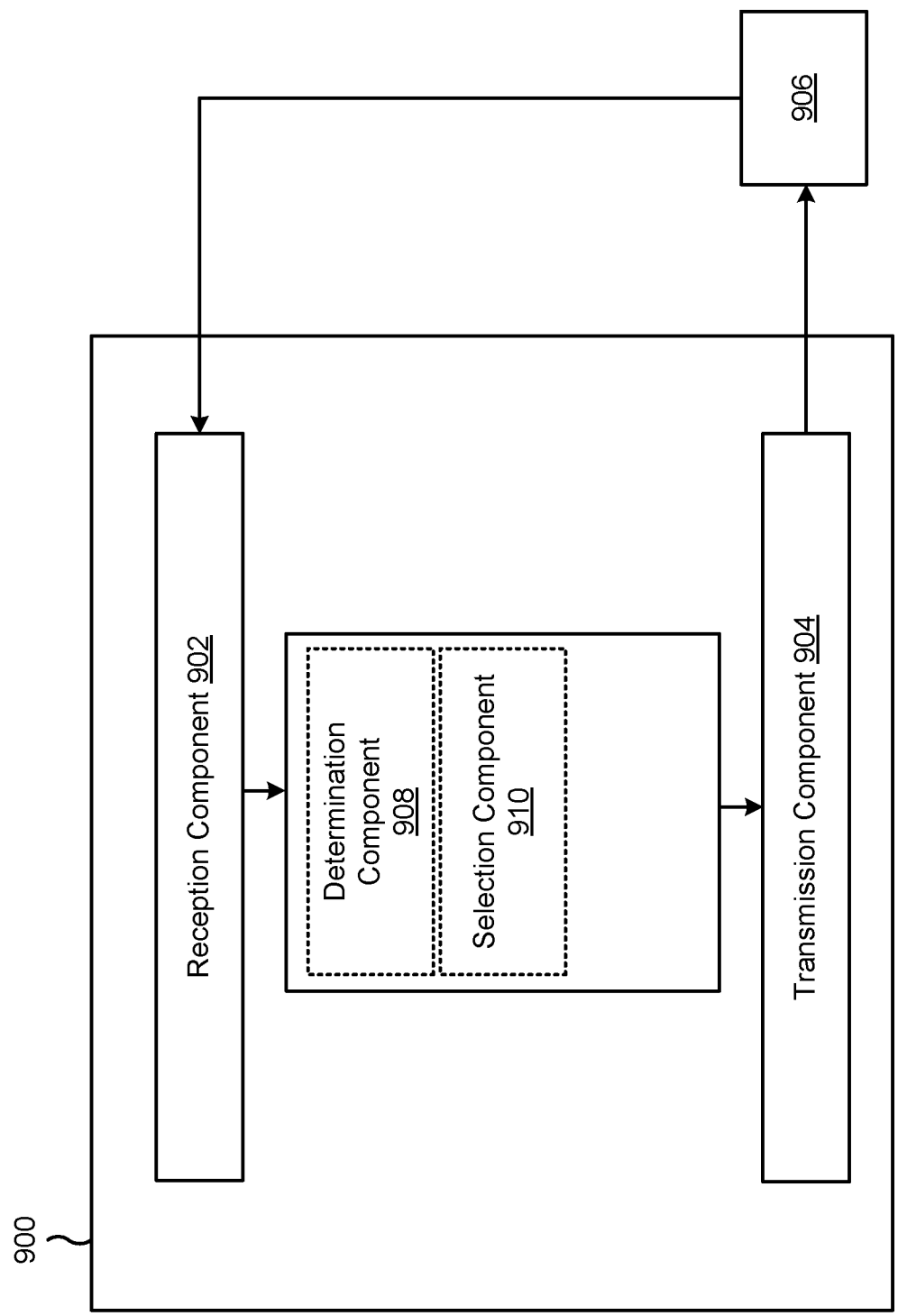
FIGS. 9-10 are block diagrams of example apparatuses for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906

(such as a UE, a base station, or another wireless communication device) using the reception component 902 and the transmission component 904. As further shown, the apparatus 900 may include a determination component 908 and/or a selection component 910, among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive SCI indicating that the UE is to transmit sidelink HARQ feedback in a type 3 codebook. The transmission component 904 may transmit the type 3 codebook on a physical sidelink channel for one or more sidelink HARQ processes based at least in part on the SCI.

The transmission component 904 may transmit an NDI for each corresponding sidelink HARQ process of the one or more sidelink HARQ processes.

The determination component 908 may determine a PSFCH resource for the type 3 codebook from a type 3 PSFCH resource pool. In some aspects, the determination component 908 may include a controller/processor, a memory, or a combination thereof, of the UE described above in connection with FIG. 2.

The transmission component 904 may transmit the type 3 codebook on the PSFCH as a single type 3 codebook for a plurality of PSFCH feedbacks based at least in part on determining that at least one of the plurality of PSFCH feedbacks is a type 3 codebook.

The selection component 910 may select the single type 3 codebook from among a plurality of type 3 codebooks, where selecting the single type 3 codebook includes selecting a type 3 codebook with a lowest index of indices of the plurality of type 3 codebooks. In some aspects, the selection component 910 may include a modulator, a transmit MIMO processor, a transmit processor, a controller/processor, a memory, or a combination thereof, of the UE described above in connection with FIG. 2. The selection component 910 may select the single type 3 codebook based at least in part on a PSFCH resource hash of one or more of a source identifier or a destination identifier.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
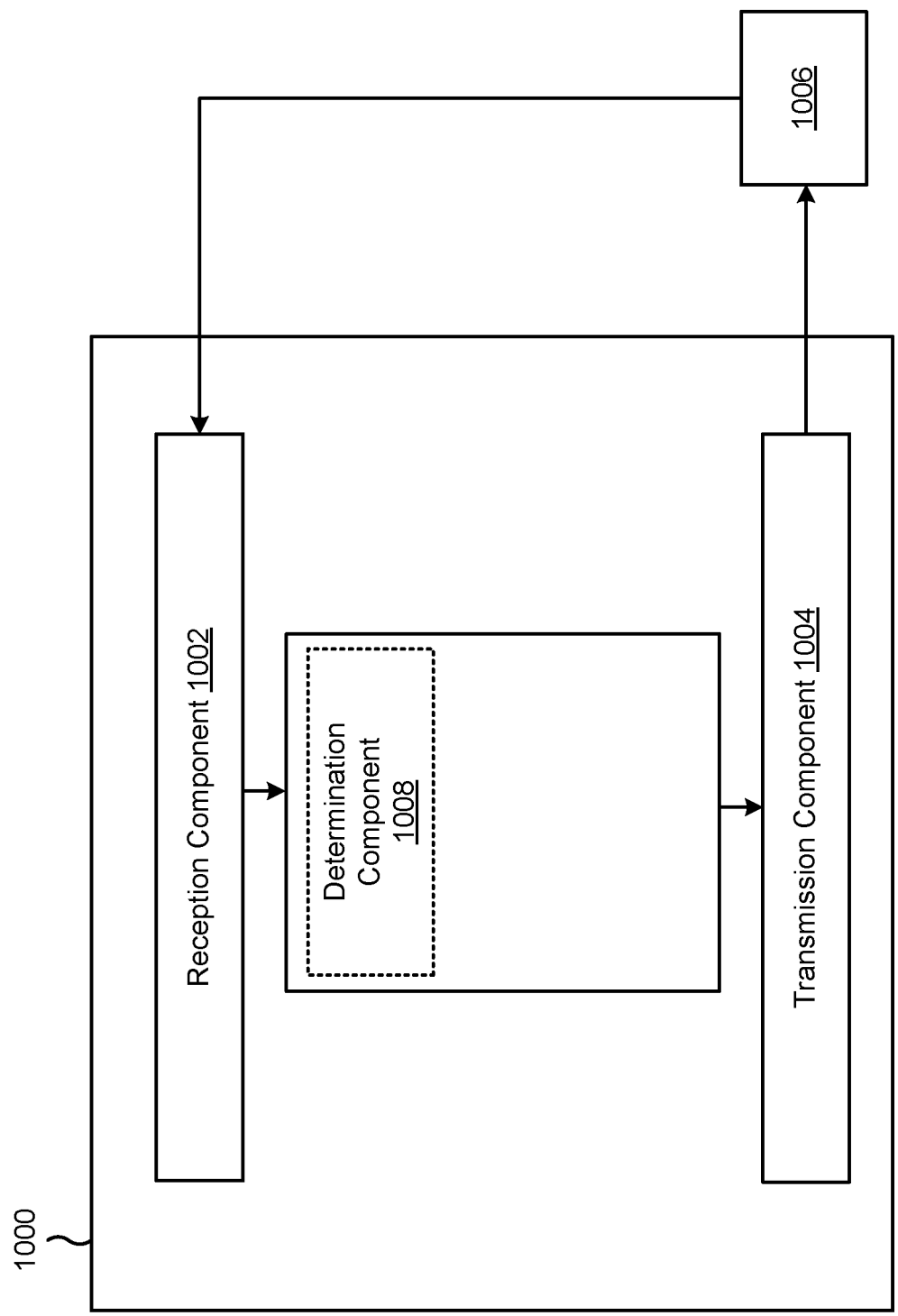

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a determination component 1008, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The determination component 1008 may determine to transmit SCI to another UE for signaling sidelink HARQ feedback. The determination component 1008 may include a controller/processor, a memory, or a combination thereof, of the UE described above in connection with FIG. 2.

The transmission component 1004 may transmit, to another UE, SCI indicating that the other UE is to transmit sidelink HARQ feedback for one or more sidelink HARQ processes in a type 3 codebook. The reception component 1002 may receive the type 3 codebook from the other UE on a physical sidelink channel after transmitting the SCI.

The reception component 1002 may receive an NDI for each corresponding sidelink HARQ process of the one or more sidelink HARQ processes. The reception component 1002 may receive a single type 3 codebook on the PSFCH, as the type 3 codebook, for a plurality of PSFCH feedbacks.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving sidelink control information (SCI) indicating that the UE is to transmit sidelink hybrid automatic repeat request (HARQ) feedback in a type 3 codebook; and transmitting the type 3 codebook on a physical sidelink channel for one or more sidelink HARQ processes based at least in part on the SCI.

Aspect 2: The method of Aspect 1, wherein the sidelink HARQ feedback includes, for each of the one or more sidelink HARQ processes, a HARQ acknowledgement (ACK) or negative acknowledgement (NACK) that is multiplexed into the type 3 codebook.

Aspect 3: The method of Aspect 1 or 2, further comprising transmitting a new data indicator for each corresponding sidelink HARQ process of the one or more sidelink HARQ processes.

Aspect 4: The method of any of Aspects 1-3, wherein the physical sidelink channel includes a physical sidelink feedback channel (PSFCH).

Aspect 5: The method of Aspect 4, further comprising determining a PSFCH resource for the type 3 codebook from a type 3 PSFCH resource pool.

Aspect 6: The method of Aspect 4, further comprising transmitting the type 3 codebook on the PSFCH as a single type 3 codebook for a plurality of PSFCH feedbacks based at least in part on determining that at least one of the plurality of PSFCH feedbacks is a type 3 codebook.

Aspect 7: The method of Aspect 6, further comprising selecting the single type 3 codebook from among a plurality of type 3 codebooks, wherein selecting the single type 3 codebook includes selecting a type 3 codebook with a lowest index of indices of the plurality of type 3 codebooks.

Aspect 8: The method of Aspect 6, further comprising selecting the single type 3 codebook based at least in part on a PSFCH resource hash of one or more of a source identifier or a destination identifier.

Aspect 9: The method of any of Aspects 1-8, wherein the physical sidelink channel includes a physical sidelink shared channel or a physical sidelink control channel.

Aspect 10: The method of any of Aspects 1-9, wherein the SCI is in format SCI2.

Aspect 11: A method of wireless communication performed by a user equipment (UE), comprising: transmitting, to another UE, sidelink control information (SCI) indicating that the other UE is to transmit sidelink hybrid automatic repeat request (HARQ) feedback for one or more sidelink HARQ processes in a type 3 codebook; and receiving the type 3 codebook from the other UE on a physical sidelink channel after transmitting the SCI.

Aspect 12: The method of Aspect 11, wherein the sidelink HARQ feedback includes, for each of the one or more sidelink HARQ processes, a HARQ acknowledgement (ACK) or negative acknowledgement (NACK) that is multiplexed into the type 3 codebook.

Aspect 13: The method of Aspect 11 or 12, further comprising receiving a new data indicator for each corresponding sidelink HARQ process of the one or more sidelink HARQ processes.

Aspect 14: The method of any of Aspects 11-13, wherein the physical sidelink channel includes a physical sidelink feedback channel (PSFCH).

Aspect 15: The method of Aspect 14, further comprising receiving a single type 3 codebook on the PSFCH, as the type 3 codebook, for a plurality of PSFCH feedbacks.

Aspect 16: The method of any of Aspects 11-15, wherein the physical sidelink channel includes a physical sidelink shared channel or a physical sidelink control channel.

Aspect 17: The method of any of Aspects 11-16, wherein the SCI is in format SCI2.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving, from a second UE, sidelink control information (SCI) indicating that the UE is to use a type 3 codebook for transmitting sidelink hybrid automatic repeat request (HARQ) feedback; and
    transmitting, to the second UE, the type 3 codebook on a physical sidelink channel for one or more sidelink HARQ processes based at least in part on the SCI indicating that the UE is to use the type 3 codebook for transmitting the sidelink HARQ feedback.

2. The method of claim 1, wherein the sidelink HARQ feedback includes, for each of the one or more sidelink HARQ processes, a HARQ acknowledgement (ACK) or negative acknowledgement (NACK) that is multiplexed into the type 3 codebook.

3. The method of claim 1, further comprising transmitting a new data indicator for each corresponding sidelink HARQ process of the one or more sidelink HARQ processes.

4. The method of claim 1, wherein the physical sidelink channel includes a physical sidelink feedback channel (PSFCH).

5. The method of claim 4, further comprising determining a PSFCH resource for the type 3 codebook from a type 3 PSFCH resource pool.

6. The method of claim 4, further comprising transmitting the type 3 codebook on the PSFCH as a single type 3 codebook for a plurality of PSFCH feedbacks based at least in part on determining that at least one of the plurality of PSFCH feedbacks is a type 3 codebook.

7. The method of claim 1, further comprising transmitting the type 3 codebook as a single type 3 codebook from among a plurality of type 3 codebooks, wherein transmitting the type 3 codebook as the single type 3 codebook is based at least in part on selecting a type 3 codebook with a lowest index of indices of the plurality of type 3 codebooks.

8. The method of claim 6, further comprising selecting the single type 3 codebook based at least in part on a PSFCH resource hash of one or more of a source identifier or a destination identifier.

9. The method of claim 1, wherein the physical sidelink channel includes a physical sidelink shared channel or a physical sidelink control channel.

10. The method of claim 1, wherein the SCI is in format SCI2.

11. A method of wireless communication performed by a user equipment (UE), comprising:
transmitting, to a second UE, sidelink control information (SCI) indicating that the second UE is to use a type 3 codebook for transmitting sidelink hybrid automatic repeat request (HARQ) feedback for one or more sidelink HARQ processes; and
receiving the type 3 codebook from the second UE on a physical sidelink channel after transmitting the SCI and based at least in on the SCI indicating that the second UE is to use the type 3 codebook for transmitting the sidelink HARQ feedback.

12. The method of claim 11, wherein the sidelink HARQ feedback includes, for each of the one or more sidelink HARQ processes, a HARQ acknowledgement (ACK) or negative acknowledgement (NACK) that is multiplexed into the type 3 codebook.

13. The method of claim 11, further comprising receiving a new data indicator for each corresponding sidelink HARQ process of the one or more sidelink HARQ processes.

14. The method of claim 11, wherein the physical sidelink channel includes a physical sidelink feedback channel (PSFCH).

15. The method of claim 14, further comprising receiving a single type 3 codebook on the PSFCH, as the type 3 codebook, for a plurality of PSFCH feedbacks.

16. The method of claim 11, wherein the physical sidelink channel includes a physical sidelink shared channel or a physical sidelink control channel.

17. The method of claim 11, wherein the SCI is in format SCI2.

18. A user equipment (UE) for wireless communication, comprising:
one or more memories; and
one or more processors, coupled to the one or more memories, configured to:
receive, from a second UE, sidelink control information (SCI) indicating that the UE is to use a type 3 codebook for transmitting sidelink hybrid automatic repeat request (HARQ) feedback; and
transmit the type 3 codebook on a physical sidelink channel for one or more sidelink HARQ processes based at least in part on the SCI indicating that the UE is to transmit use the type 3 codebook for transmitting the sidelink HARQ feedback.

19. The UE of claim 18, wherein the sidelink HARQ feedback includes, for each of the one or more sidelink HARQ processes, a HARQ acknowledgement (ACK) or negative acknowledgement (NACK) that is multiplexed into the type 3 codebook.

20. The UE of claim 18, wherein the one or more processors are configured to transmit a new data indicator for each corresponding sidelink HARQ process of the one or more sidelink HARQ processes.

21. The UE of claim 18, wherein the physical sidelink channel includes a physical sidelink feedback channel (PSFCH).

22. The UE of claim 21, wherein the one or more processors are configured to determine a PSFCH resource for the type 3 codebook from a type 3 PSFCH resource pool.

23. The UE of claim 21, wherein the one or more processors are configured to transmit the type 3 codebook on the PSFCH as a single type 3 codebook for a plurality of PSFCH feedbacks based at least in part on determining that at least one of the plurality of PSFCH feedbacks is a type 3 codebook.

24. The UE of claim 18, wherein the one or more processors are configured to transmit the type 3 codebook as a single type 3 codebook from among a plurality of type 3 codebooks, wherein transmitting the type 3 codebook as the single type 3 codebook is based at least in part on selecting a type 3 codebook with a lowest index of indices of the plurality of type 3 codebooks.

25. The UE of claim 23, wherein the one or more processors are configured to select the single type 3 codebook based at least in part on a PSFCH resource hash of one or more of a source identifier or a destination identifier.

26. A user equipment (UE) for wireless communication, comprising:
one or more memories; and
one or more processors, coupled to the one or more memories, configured to:
transmit, to a second UE, sidelink control information (SCI) indicating that the second UE is to use a type 3 codebook for transmitting sidelink hybrid automatic repeat request (HARQ) feedback for one or more sidelink HARQ processes; and
receive the type 3 codebook from the second UE on a physical sidelink channel after transmitting the SCI and based at least in part on the SCI indicating that the second UE is to use the type 3 codebook for transmitting the sidelink HARQ feedback.

27. The UE of claim 26, wherein the sidelink HARQ feedback includes, for each of the one or more sidelink HARQ processes, a HARQ acknowledgement (ACK) or negative acknowledgement (NACK) that is multiplexed into the type 3 codebook.

28. The UE of claim 26, wherein the one or more processors are configured to receive a new data indicator for each corresponding sidelink HARQ process of the one or more sidelink HARQ processes.

29. The UE of claim 26, wherein the physical sidelink channel includes a physical sidelink feedback channel (PSFCH).

30. The UE of claim 29, wherein the one or more processors are further configured to receive a single type 3 codebook on the PSFCH, as the type 3 codebook, for a plurality of PSFCH feedbacks.

* * * * *